United States Patent
Chen et al.

(10) Patent No.: US 12,510,742 B2
(45) Date of Patent: Dec. 30, 2025

(54) MICRO DISTANCE ADJUSTING MECHANISM AND MICROSCOPE DEVICE

(71) Applicant: Aidmics Biotechnology Co., Ltd., Taipei (TW)

(72) Inventors: Chang-Yu Chen, Taipei (TW); Chang-Ching Yeh, Taipei (TW)

(73) Assignee: AIDMICS BIOTECHNOLOGY CO., LTD., Taipei (TW)

( * ) Notice: Subject to any disclaimer, the term of this patent is extended or adjusted under 35 U.S.C. 154(b) by 343 days.

(21) Appl. No.: 18/329,162

(22) Filed: Jun. 5, 2023

(65) Prior Publication Data

US 2023/0393378 A1    Dec. 7, 2023

(30) Foreign Application Priority Data

Jun. 6, 2022 (TW) ................................. 111120940

(51) Int. Cl.
  *G02B 21/36*  (2006.01)
  *G02B 7/02*   (2021.01)
  *G02B 21/00*  (2006.01)

(52) U.S. Cl.
  CPC ........... *G02B 21/362* (2013.01); *G02B 7/022* (2013.01); *G02B 7/023* (2013.01); *G02B 21/0008* (2013.01)

(58) Field of Classification Search
  CPC ...... G02B 21/362; G02B 7/022; G02B 7/023; G02B 21/0008
  USPC ................................. 359/368, 234, 700–702
  See application file for complete search history.

(56) References Cited

U.S. PATENT DOCUMENTS

| | | | |
|---|---|---|---|
| 10,495,868 B2 * | 12/2019 | Lin | G01N 21/03 |
| 2005/0002093 A1 | 1/2005 | Bonaventura | |
| 2006/0176548 A1 * | 8/2006 | Terada | G01N 21/956 |
| | | | 359/368 |
| 2007/0063591 A1 * | 3/2007 | Yasuda | H01F 7/14 |
| | | | 359/701 |
| 2011/0242636 A1 * | 10/2011 | Viglione | G03B 9/10 |
| | | | 359/234 |
| 2016/0004057 A1 * | 1/2016 | Lin | G02B 21/0008 |
| | | | 359/386 |

(Continued)

FOREIGN PATENT DOCUMENTS

CN    102289064 A  * 12/2011
CN    202133814 U  *  2/2012

(Continued)

*Primary Examiner* — Tarifur R Chowdhury
(74) *Attorney, Agent, or Firm* — MUNCY, GEISSLER, OLDS & LOWE, P.C.

(57) ABSTRACT

A micro distance adjusting mechanism includes a first element having a first body and a first screw-connecting portion, a second element having a second body and a second screw-connecting portion, and a connection member. The first body has a first through hole on an optical route, and the second body has a second through hole on the optical route. The objective lens unit is telescoped in the first and second through holes. The first screw-connecting portion is rotatably connected to the second screw-connecting portion, and the first and second bodies make a relative rotation range during the micro distance adjustment. The connection member is connected to the first body or the second body to limit the relative rotation range within 360 degrees and the range of the micro distance adjustment to 0.1 mm~3.5 mm.

17 Claims, 6 Drawing Sheets

(56) References Cited

U.S. PATENT DOCUMENTS

| | | | | |
|---|---|---|---|---|
| 2016/0097922 A1* | 4/2016 | Heeb | ............... | G02B 21/24 |
| | | | | 359/380 |
| 2017/0160534 A1* | 6/2017 | Fan | ............... | G02B 21/361 |
| 2017/0227757 A1* | 8/2017 | Lin | ............... | G02B 13/001 |
| 2024/0142759 A1* | 5/2024 | Wang | ............... | G02B 21/34 |

FOREIGN PATENT DOCUMENTS

| | | | | | |
|---|---|---|---|---|---|
| CN | 208999651 U | * | 6/2019 | | |
| CN | 110262027 A | | 9/2019 | | |
| CN | 117850015 A | * | 4/2024 | ............. | G02B 21/06 |
| CN | 118259446 A | * | 6/2024 | | |
| DE | 202009004432 U1 | * | 6/2009 | ........... | G02B 21/362 |
| EP | 3130954 A1 | * | 2/2017 | ............. | G02B 21/06 |
| EP | 3168670 A1 | * | 5/2017 | ............. | C12M 21/06 |
| EP | 3203293 A1 | * | 8/2017 | ............. | G01N 21/03 |
| JP | 2017138598 A | | 8/2017 | | |
| TW | 201706671 A | | 2/2017 | | |

\* cited by examiner

MICRO DISTANCE ADJUSTING MECHANISM AND MICROSCOPE DEVICE

CROSS REFERENCE TO RELATED APPLICATIONS

This Non-provisional application claims priority under 35 U.S.C. § 119(a) on Patent Application No(s). 111120940 filed in Taiwan, Republic of China on Jun. 6, 2022, the entire contents of which are hereby incorporated by reference.

BACKGROUND

Technology Field

The present disclosure relates to a micro distance adjusting mechanism and a microscope device using the same.

Description of Related Art

Generally, a traditional microscope mostly refers to an optical microscope, which is used to observe microorganisms, cells or fine structures of some substances. The microscope utilizes one or more lenses to magnify the sample image and send the magnified sample image to viewer's eyes or an image apparatus for observation.

In recent years, with the popularization of smart communication devices (e.g. mobile phones) and the enhancement of the camera function of the smart communication devices, there are many commercial microscope devices on the market that can be used and cooperated with the camera lens of the smart communication device to observe a target sample, so as to carry out a portable minimized microscope device.

Although the conventional portable minimized microscope device can effectively reduce the volume of overall structure to achieve the goal of miniaturization, and can observe a target sample along with the camera of the smart communication device, however, when observing the target sample, the relative positions of the microscope device and the smart communication device are usually remained constant. Therefore, when the thickness of the target sample changes (which can be different thicknesses of different samples or different thicknesses of different parts of the same sample) or the position of the target sample is improper for observation, the portable minimized microscope device cannot observe the target sample at an optimum position. In this case, the operator must reposition the target sample, or even prepare the sample for observation again. These cumbrous procedures will cause great inconvenience to the operator. Furthermore, the focal length of the objective lens of the microscope device is fixed, and the distance between the objective lens and the sample carrier (such as a glass slide) is also fixed. Accordingly, when it is used to observe three-dimensional samples, usually only the surface of the three-dimensional sample or the image of a certain section can be observed. In other words, if the operator wants to observe different sections of a three-dimensional sample, or the surfaces of multiple three-dimensional samples with different thicknesses or heights, the only option for clearly observing the three-dimensional sample is to rearrange the target sample or prepare the target sample again. This operation leads to the observation of the three-dimensional sample that cannot be carried out quickly and conveniently.

SUMMARY

In view of the foregoing, an objective of this disclosure is to provide a micro distance adjusting mechanism and a microscope device using the same, which can quickly adjust the distance between the target sample and the objective lens of the microscope device, thereby performing the observation at the optimum position and conveniently observing the three-dimensional sample.

To achieve the above, this disclosure provides a micro distance adjusting mechanism, which is configured for providing a micro distance adjustment of an objective lens unit of a microscope device on an optical route. The micro distance adjusting mechanism includes a first element, a second element, and a connection member. The first element includes a first body and a first screw-connecting portion, and the first body has a first through hole on the optical route. The second element includes a second body and a second screw-connecting portion, and the second body has a second through hole on the optical route. The objective lens unit is telescoped in the first through hole and the second through hole, the first screw-connecting portion is rotatably connected to the second screw-connecting portion, and the first body and the second body are relative movable with a relative rotation range during the micro distance adjustment. The connection member is connected to the first body or the second body. The connection member is configured to limit the relative rotation range within 360 degrees and to restrict a range of the micro distance adjustment to 0.1 mm~3.5 mm.

To achieve the above, this disclosure provides a micro distance adjusting mechanism, which is configured for providing a micro distance adjustment of an objective lens unit of a microscope device on an optical route. The micro distance adjusting mechanism includes a first element and a second element. The first element includes a first body, and the first body has a first through hole on the optical route. The second element includes a second body, and the second body has a second through hole on the optical route. The objective lens unit is telescoped in the first through hole and the second through hole, the first body and the second body are relative-movably connected, and the first body and the second body make a relative movement with each other during the micro distance adjustment. The relative movement includes a relative displacement and/or a relative rotation, wherein a range of the relative rotation is less than 360 degrees, and a range of the micro distance adjustment is between 0.1 mm and 3.5 mm.

To achieve the above, this disclosure further provides a microscope device, which includes an objective lens unit and a micro distance adjusting mechanism. The micro distance adjusting mechanism is configured for providing a micro distance adjustment of the objective lens unit on an optical route, and the micro distance adjusting mechanism includes a first element, a second element, and a connection member. The first element includes a first body and a first screw-connecting portion, and the first body has a first through hole on the optical route. The second element includes a second body and a second screw-connecting portion, and the second body has a second through hole on the optical route. The objective lens unit is telescoped in the first through hole and the second through hole, the first screw-connecting portion is rotatably connected to the second screw-connecting portion, and the first body and the second body are relative movable with a relative rotation range during the micro distance adjustment. The connection member is connected to the first body or the second body. The connection member is configured to limit the relative rotation range within 360 degrees and to restrict a range of the micro distance adjustment to 0.1 mm~3.5 mm.

To achieve the above, this disclosure further provides a microscope device, which includes an objective lens unit and a micro distance adjusting mechanism. The micro distance adjusting mechanism is configured for providing a micro distance adjustment of the objective lens unit on an optical route. The micro distance adjusting mechanism includes a first element and a second element. The first element includes a first body, and the first body has a first through hole on the optical route. The second element includes a second body, and the second body has a second through hole on the optical route. The objective lens unit is telescoped in the first through hole and the second through hole, the first body and the second body are relative-movably connected, and the first body and the second body make a relative movement with each other during the micro distance adjustment. The relative movement includes a relative displacement and/or a relative rotation, wherein a range of the relative rotation is less than 360 degrees, and a range of the micro distance adjustment is between 0.1 mm and 3.5 mm.

In one embodiment, the connection member is connected to one of the first body and the second body, the other one of the first body and the second body is configured with an annular recess, and one end of the connection member extends into the annular recess.

In one embodiment, the micro distance adjusting mechanism further includes a stopper portion arranged on a rotation route of the connection member so as to limit the relative rotation range within 360 degrees.

In one embodiment, the connection member is a bolt or a pin, and the stopper portion is a protrusion.

In one embodiment, the connection member extends in an axial direction or a radial direction to connect the first body or the second body.

In one embodiment, the micro distance adjusting mechanism further includes a damping structure contacting against the connection member.

In one embodiment, the damping structure is a rough surface, an uneven surface, a wavy surface, a serrated surface, a silicone material, a rubber material, or a combination thereof.

In one embodiment, the edge of the second element is configured with a scale mark.

In one embodiment, the microscope device further includes a stationary fixture having an opening located on the optical route, the micro distance adjusting mechanism is connected to the stationary fixture, and the objective lens unit corresponds to the opening.

In one embodiment, the stationary fixture is configured to clamp an image capturing device, so that the image capturing device is arranged close to the objective lens unit and located on the optical route.

In one embodiment, the microscope device further includes a sample carrier module detachably connected to the second element, and the sample carrier module has a sample observation zone close to the objective lens unit.

In one embodiment, the sample carrier module is detachably connected to the second element by magnetic attraction.

As mentioned above, the micro distance adjusting mechanism of this disclosure includes a first element, a second element and a connection member. The first element includes a first body and a first screw-connecting portion, and the second element includes a second body and a second screw-connecting portion. The objective lens unit is telescoped in a first through hole of the first body and a second through hole of the second body, the first screw-connecting portion is rotatably connected to the second screw-connecting portion, and the first body and the second body are relative movable with a relative rotation range during the micro distance adjustment. The connection member is connected to the first body or the second body for limiting the relative rotation range within 360 degrees and restricting a range of the micro distance adjustment to 0.1 mm~3.5 mm. Based on this design, the micro distance adjusting mechanism enables the objective lens unit of the microscope device to make a macro adjustment within a certain range on the optical route, so the distance between the objective lens unit and the target sample can be adjusted quickly and easily, thereby performing the observation at an optimum position and conveniently observing the three-dimensional sample.

Moreover, the micro distance adjusting mechanism of this disclosure includes a first element and a second element. The first element includes a first body, and the second element includes a second body. The objective lens unit is telescoped in a first through hole of the first body and a second through hole of the second body, the first body and the second body are relative-movably connected, and the first body and the second body make a relative movement with each other during the micro distance adjustment. The relative movement includes a relative displacement and/or a relative rotation, wherein a range of the relative rotation is less than 360 degrees, and a range of the micro distance adjustment is between 0.1 mm and 3.5 mm. Based on this design, the micro distance adjusting mechanism enables the objective lens unit of the microscope device to make a macro adjustment within a certain range on the optical route, so the distance between the objective lens unit and the target sample can be adjusted quickly and easily, thereby performing the observation at an optimum position and conveniently observing the three-dimensional sample.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
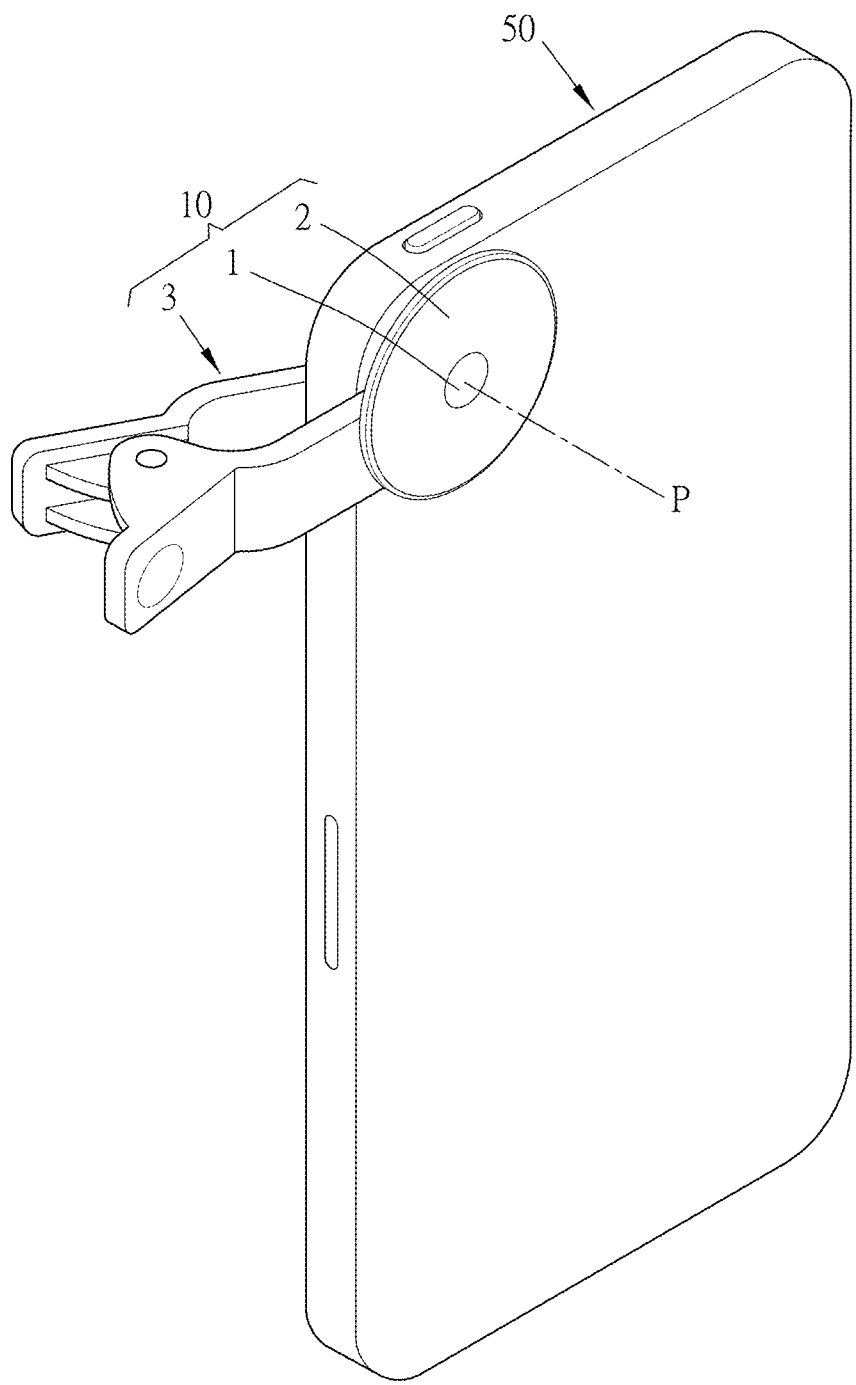
FIG. 1A is a schematic diagram showing a microscope device according to an embodiment of this disclosure in cooperate with a smart communication device.
Figure 1B:
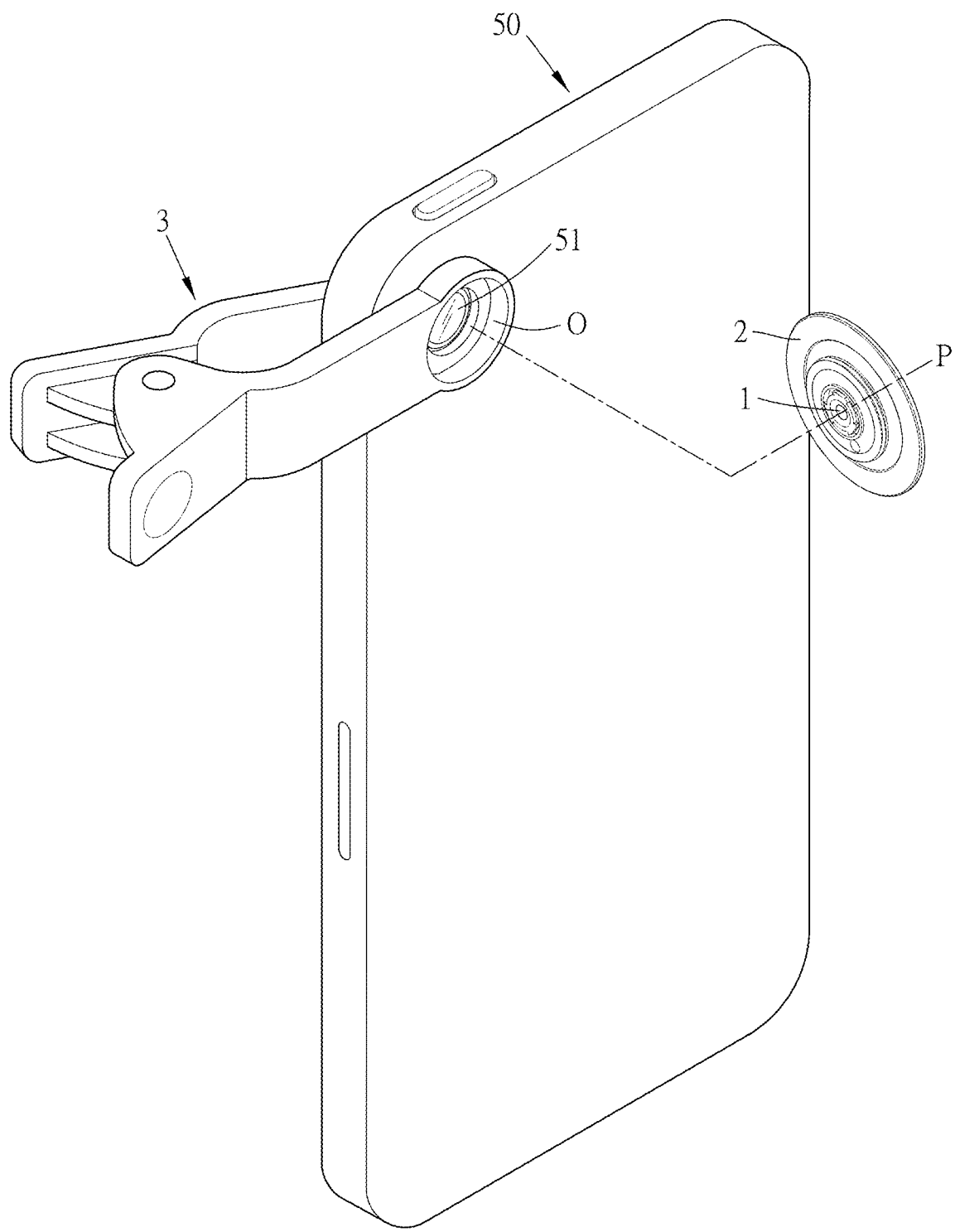
FIG. 1B is an exploded view of the microscope device of FIG. 1A.

FIG. 1A is a schematic diagram showing a microscope device 10 according to an embodiment of this disclosure in cooperate with a smart communication device and FIG. 1B is an exploded view of the microscope device 10 of FIG. 1A.

Referring to FIGS. 1A and 1B, the microscope device 10 includes an objective lens unit 1 and a micro distance adjusting mechanism 2, and the micro distance adjusting mechanism 2 is configured for providing a micro distance adjustment of the objective lens unit 1 on an optical route P. In this embodiment, when performing the micro distance adjustment, the micro distance adjusting mechanism 2 can provide the micro distance adjustment within the range of 0.1 mm~3.5 mm.

As shown in FIGS. 1A and 1B, the microscope device 10 further includes a stationary fixture 3 having an opening O located on the optical route P. The micro distance adjusting mechanism 2 is connected to the stationary fixture 3, and the objective lens unit 1 corresponds to the opening O. Specifically, the stationary fixture 3 is configured to clamp an image capturing device 51 of a smart communication device so that the image capturing device 51 is arranged close to the objective lens unit 1 and located on the optical route P.

Figure 1C:
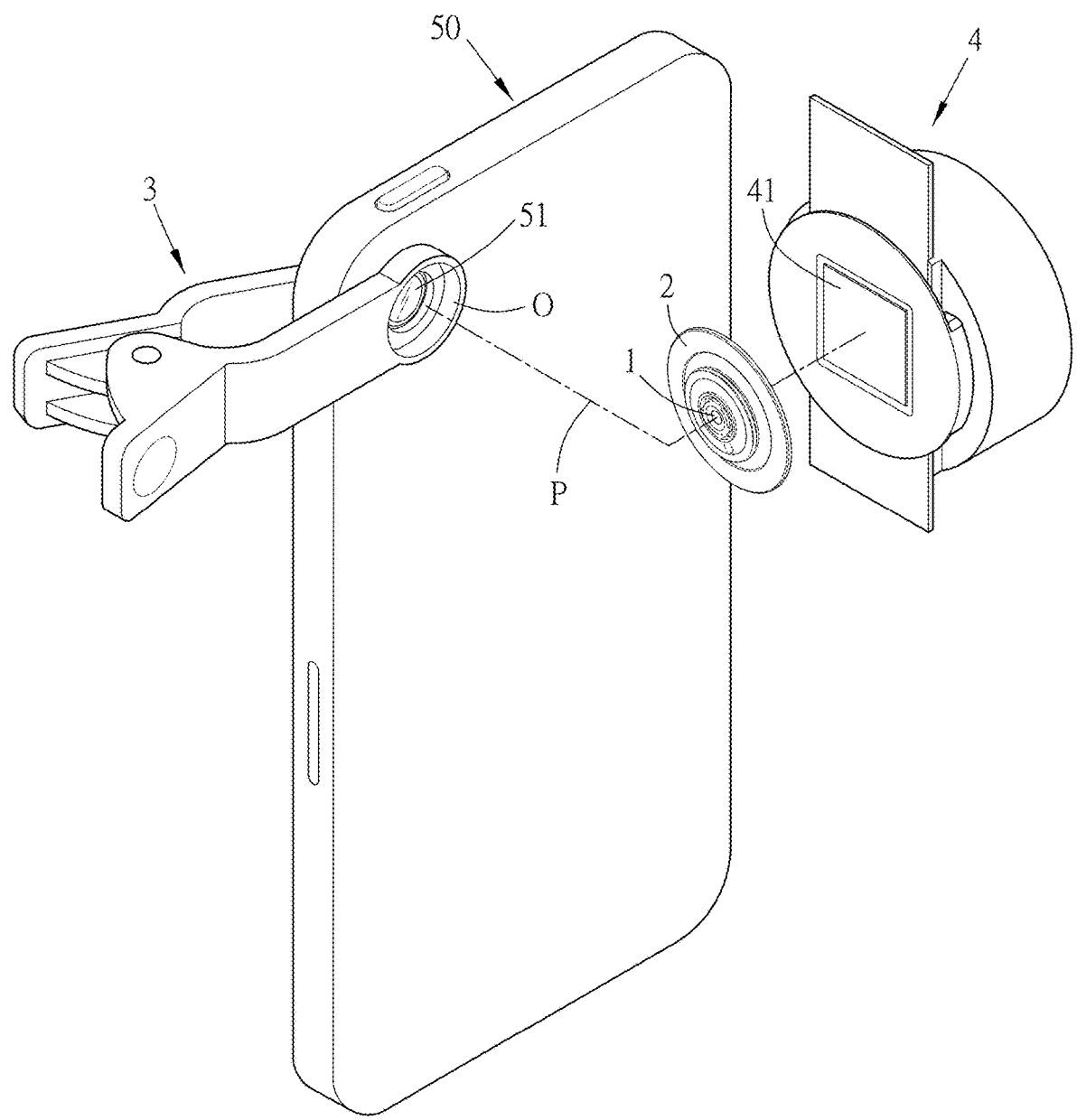
FIG. 1C is another exploded view of the microscope device of FIG. 1A, wherein the microscope device further includes a sample carrier module.

In addition, as shown in FIG. 1C, the microscope device 10 of this embodiment further includes a sample carrier module 4 detachably connected to the micro distance adjusting mechanism 2, wherein the sample carrier module 4 has a sample observation zone 41 close to the objective lens unit 1. In one embodiment, the sample carrier module 4 can be detachably connected to the micro distance adjusting mechanism 2 by magnetic attraction. To be noted, the sample carrier module 4 can also be detachably connected to the micro distance adjusting mechanism 2 by any of other means, and this disclosure is not limited thereto.

The operation procedure of using the microscope device 10 of this embodiment to observe the target sample will be described in the following example. First of all, the user can mount the objective lens unit 1 in the macro distance adjusting mechanism 2 and connect the macro distance adjusting mechanism 2 to the stationary fixture 3. In this embodiment, the objective lens unit 1 can be mounted in the macro distance adjusting mechanism 2 by threading or screwing, and the macro distance adjusting mechanism 2 can be connected to the stationary fixture 3 by threading or screwing. To be noted, the objective lens unit 1 can be mounted in the macro distance adjusting mechanism 2 by any of other suitable means, and the macro distance adjusting mechanism 2 can be connected to the stationary fixture 3 by any of other suitable means. The disclosure is not limited thereto.

Next, the user can put the target sample on the sample observation zone 41 of the sample carrier module 4. In one embodiment, the target sample can be placed on a glass slide, and can be optionally covered by a cover glass. Then, the prepared target sample (on the glass slide) is placed in the sample observation zone 41 (see FIG. 1C). In another embodiment, a sticker can be put on the target sample for sampling the target sample, and then the sticker containing the target sample is directly pasted on the sample observation zone 41 (not shown). In another embodiment, the liquid solution containing the target sample can be directly dropped on the sample observation zone 41. In this case, the sample observation zone 41 can be provided with an accommodating structure to accommodate the liquid sample (not shown). It should be noted that this embodiment can also use other methods to place the target sample in the sample observation zone 41 of the sample carrier module 4, and this disclosure is not limited thereto. In addition, this embodiment does not limit the target sample to be observed, which can be, for example but not limited to, leather, jewelry, jade, biological sample, skin, or the like.

Moreover, in addition to using ambient light to observe the target sample, the sample carrier module 4 of this embodiment may further include a light source unit (not shown) for providing additional light, so that the observed image of the target sample can be more clear and bright.

Finally, the user can activate the camera function of the smart communication device 50 and utilize the image capturing device 51 to capture images. In this case, the image capturing device 51, the opening O of the stationary fixture 3 and the objective lens unit 1 are all located on the optical route P in order, so that the image capturing device 51 can capture the image of the target sample located in the sample observation zone 41. In particular, in this embodiment, the user can use the macro distance adjustment function provided by the macro distance adjusting mechanism 2 to adjust the micro distance between the objective lens unit 1 and the target sample (within the range of 0.1 mm to 3.5 mm), so that the target sample can be observed at the optimum observation position. In addition, it is possible to easily observe different sections of a three-dimensional sample, or the surfaces of multiple three-dimensional samples with different thicknesses/heights.

The detailed design of the micro distance adjusting mechanism of this disclosure will be described below to illustrate the mechanism for providing the macro distance adjustment.

Figure 2A:
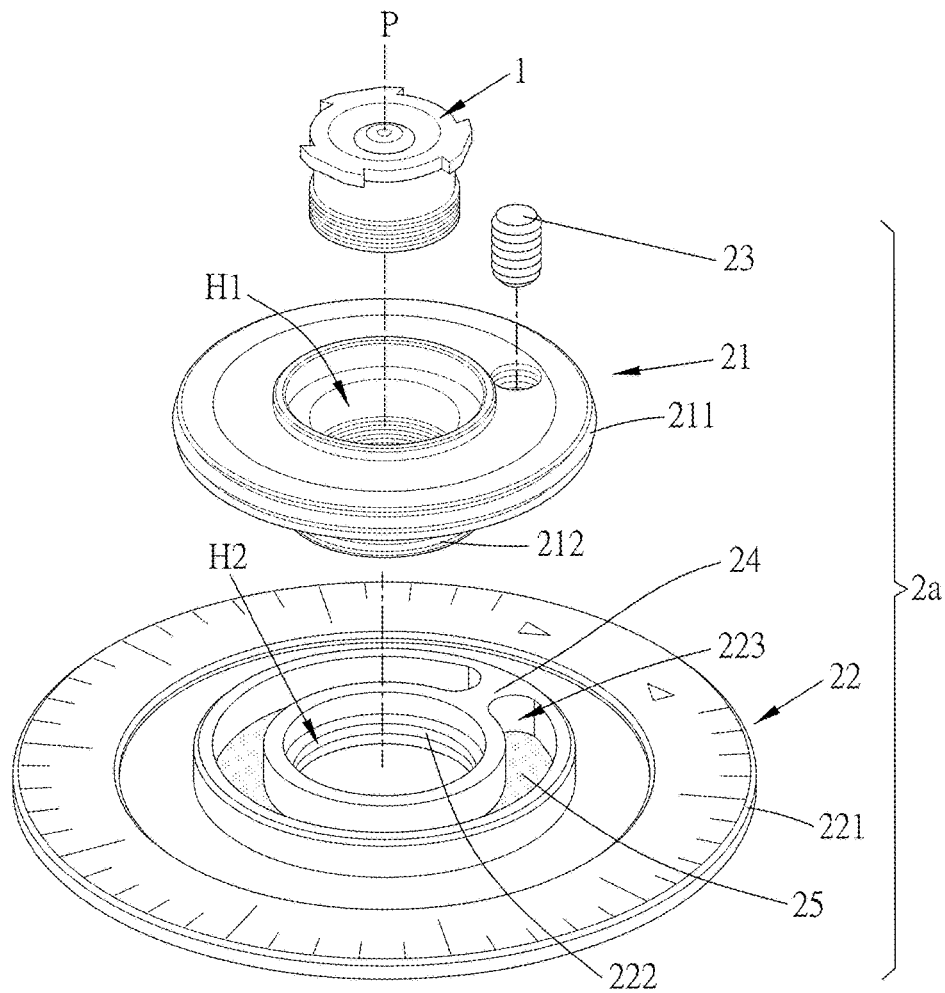
FIG. 2A is an exploded view of a micro distance adjusting mechanism according to a first embodiment of this disclosure.
Figure 2B:
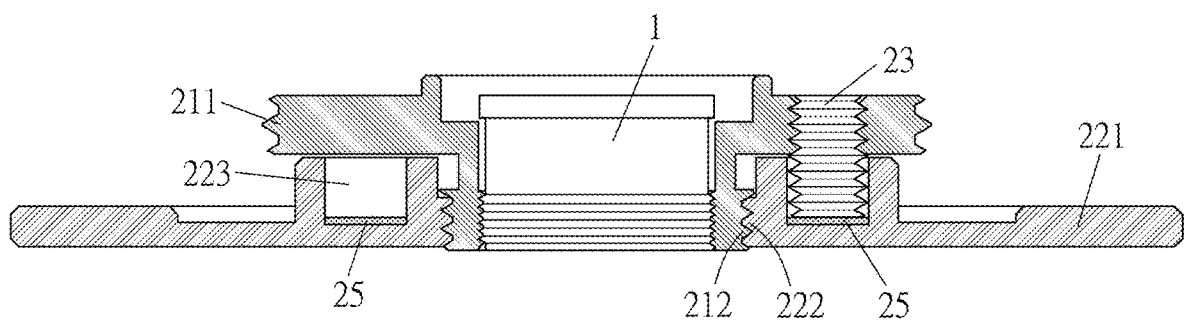
FIG. 2B is a sectional view of the micro distance adjusting mechanism of FIG. 2A.

FIG. 2A is an exploded view of a micro distance adjusting mechanism 2a according to a first embodiment of this disclosure, and FIG. 2B is a sectional view of the micro distance adjusting mechanism 2a of FIG. 2A.

As shown in FIGS. 2A and 2B, the micro distance adjusting mechanism 2a includes a first element 21, a second element 22, and a connection member 23. The first element 21 includes a first body 211 and a first screw-connecting portion 212, and the first body 211 has a first through hole H1 on the optical route P. The second element 22 includes a second body 221 and a second screw-connecting portion 222, and the second body 221 has a second through hole H2 on the optical route P. The objective lens unit 1 is telescoped in the first through hole H1 and the second through hole H2. For example, the objective lens unit 1 can be telescoped and mounted in the first through hole H1 and the second through hole H2 by screwing or threading. The first screw-connecting portion 212 is rotatably connected to the second screw-connecting portion 222, and the first body 211 and the second body 221 are relative movable with a relative rotation range during the micro distance adjustment. The connection member 23 is connected to the first body 211 or the second body 221. The connection member 23 is configured to limit the relative rotation range within 360 degrees and to restrict a range of the micro distance adjustment to 0.1 mm~3.5 mm. In this embodiment, each of the first screw-connecting portion 212 and the second screw-connecting portion 222 is configured with a thread structure, and the first screw-connecting portion 212 and the second screw-connecting portion 222 are engaged with each other by the thread structures thereof. Based on the design of the thread structures, when the relative rotation range of the first body 211 and the second body 221 is limited within 360 degrees, the micro distance adjustment is correspondingly limited within one pitch of the thread structure. In other words, if the pitch of the thread structure is between 0.1 mm and 3.5 mm, the range of the micro distance adjustment is between 0.1 mm and 3.5 mm. To be noted, in this embodiment, the objective lens unit 1 is relatively fixed to the first element 21 (the first through hole H1), and the target sample in the sample observation zone 41 is relatively fixed to the second element 22. Therefore, when the micro distance adjusting mechanism 2 is operated to adjust the distance between the first element 21 and the second element 22, the distance between the objective lens unit 1 and the target sample is simultaneously adjusted (within the range from 0.1 mm to 3.5 mm), so that the target sample can be observed at the optimum observation position. In addition, it is possible to easily observe different sections of a three-dimensional sample, or the surfaces of multiple three-dimensional samples with different thicknesses/heights.

In this embodiment, the connection member 23 is connected to the first body 211. As shown in FIG. 2A, the connection member 23 is connected to the first body 211 in the axial direction, and is disposed at the outer side of the first screw-connecting portion 212. The second body 221 is provided with an annular recess 223, and one end of the connection member 23 extends into the annular recess 223 (see FIG. 2B). In addition, in this embodiment, the macro distance adjusting mechanism 2 further includes a stopper portion 24 disposed on the rotation route of the connection member 23. In this case, the stopper portion 24 is arranged in the annular recess 223 to limit the rotation angle of the connecting member 23 in the annular recess 223. That is, this design can limit the relative rotation of the first body 211 and the second body 221 to a range of less than 360 degrees. In practice, since the first body 211 and the second body 221 can be relatively rotated by less than 360 degrees, the range of the macro distance adjustment is within 0.1 mm to 3.5 mm, so that the distance between the objective lens unit 1 and the target sample located in the sample observation zone 41 can be adjusted during the macro distance adjustment within the range from 0.1 mm to 3.5 mm.

In this embodiment, the connection member 23 is a bolt, and the stopper portion 24 is a protrusion. To be noted, the connection member 23 and the stopper portion 24 can be any of other suitable structures, and this disclosure is not limited thereto. For example, the connection member 23 is a pin.

In this embodiment, the micro distance adjusting mechanism 2 further includes a damping structure 25, which contacts against the connection member 23. In this case, the damping structure 25 is a rough surface formed on the bottom of the annular recess 223, and the lower edge of the connection member 23 contacts against the damping structure 25 formed on the bottom of the annular recess 223. Accordingly, when the first body 211 is rotated to a proper angle with relative to the second body 221 (i.e. reaching the preferred or optimum observation position), the relative positions of the first body 211 and the second body 221 can be fixed based on the design of the damping structure 25. Therefore, the relative positions of the image capturing device 51, the objective lens unit 1 and the target sample in the sample observation zone 41 are also fixed, so that the image capturing device 51 can capture the image of the sample in a stable status, thereby smoothly performing the sample observation.

In other embodiments, the damping structure 25 can be, for example but not limited to, an uneven surface, a wavy surface, a serrated surface, a silicone material, a rubber material, or a combination thereof, and this disclosure is not limited thereto.

In this embodiment, the edge of the second element 22 can be configured with a scale mark for indicating the relative rotation range of the first body 211 and the second body 221. For example, the scale mark can be from 0° to 350°, or from 0 to 9 (total 350°). To be noted, this example is for an illustration only, and this disclosure is not limited thereto.

Figure 3A:
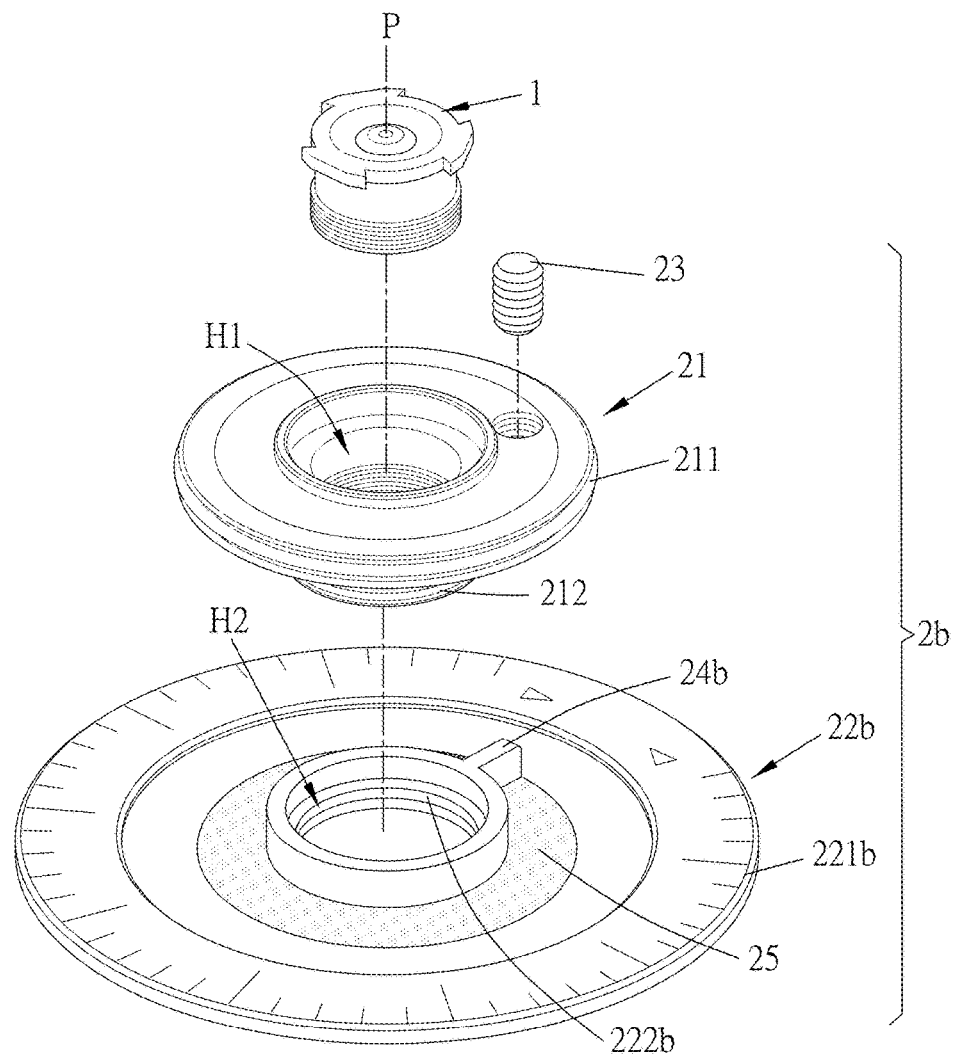
FIG. 3A is an exploded view of a micro distance adjusting mechanism according to a second embodiment of this disclosure.
Figure 3B:
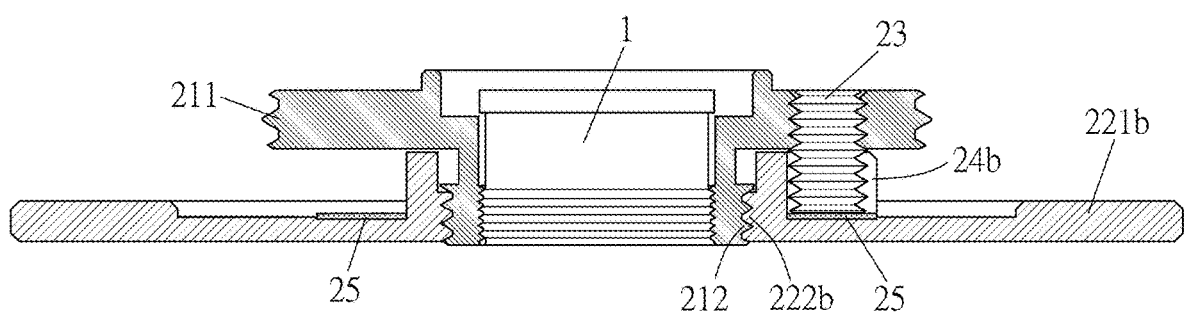
FIG. 3B is a sectional view of the micro distance adjusting mechanism of FIG. 3A.

FIG. 3A is an exploded view of a micro distance adjusting mechanism 2b according to a second embodiment of this disclosure, and FIG. 3B is a sectional view of the micro distance adjusting mechanism 2b of FIG. 3A.

Referring to FIGS. 3A and 3B, the component structures and connections of the micro distance adjusting mechanism 2b of the second embodiment are mostly the same as those of the above-mentioned micro distance adjusting mechanism 2a of the first embodiment. Unlike the first embodiment, the second body 221b of the second element 22b of the micro distance adjusting mechanism 2b is not configured with the annular recess. In the second embodiment, one end of the connection member 23 is arranged at the outer periphery of the second screw-connecting portion 222b as shown in see FIG. 3B. In addition, the stopper portion 24b of the micro distance adjusting mechanism 2b is protruded from the outer periphery of the second screw-connecting portion 222b and is located on the rotation route of the connection member 23 to limit the rotation angle of the connection member 23 along the outer periphery of the second screw-connecting portion 222b. In other words, this design can limit the relative rotation range of the first body 211 and the second body 221b to be less than 360 degrees.

Figure 4A:
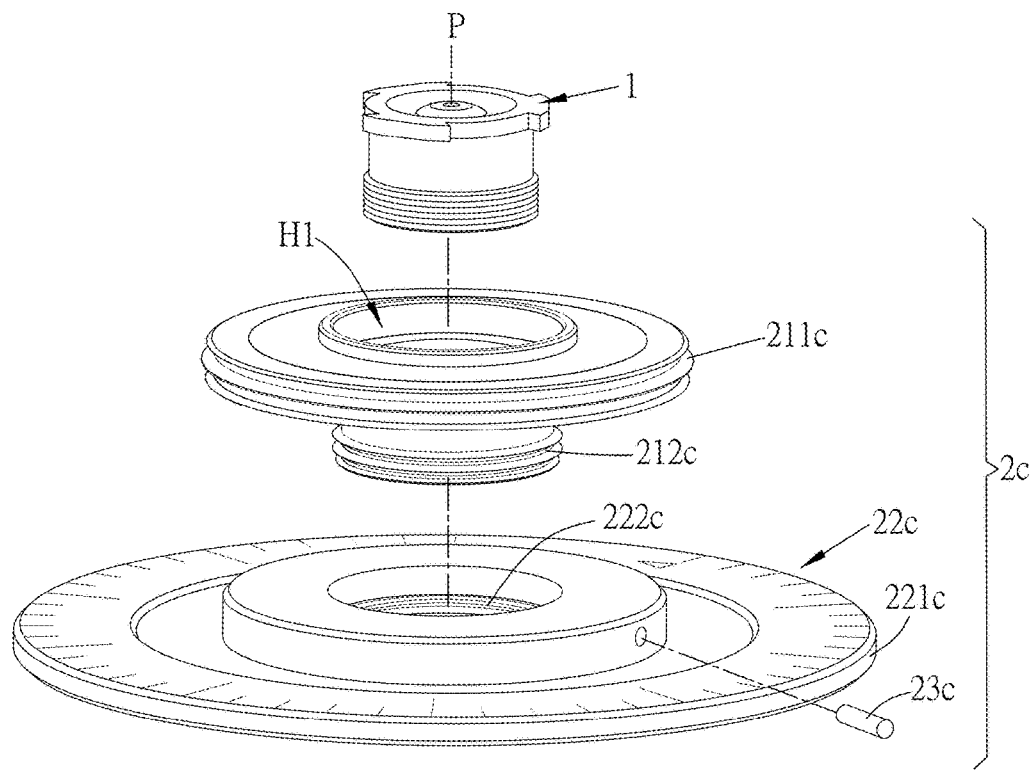
FIG. 4A is an exploded view of a micro distance adjusting mechanism according to a third embodiment of this disclosure.
Figure 4B:
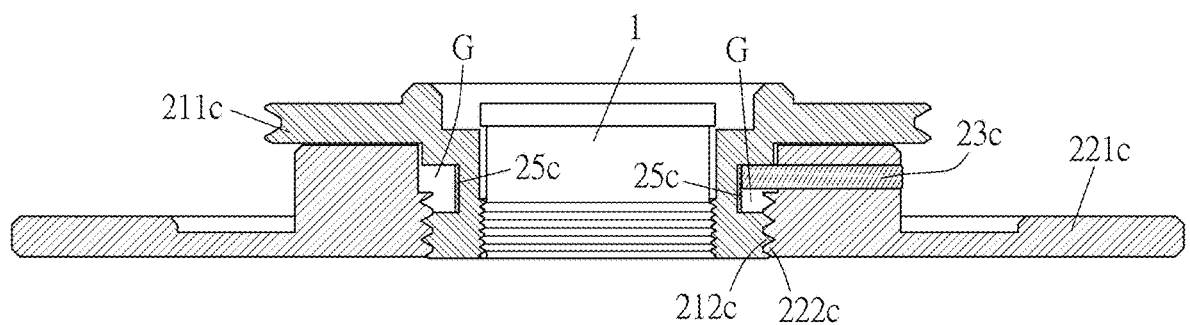
FIG. 4B is a sectional view of the micro distance adjusting mechanism of FIG. 4A.

FIG. 4A is an exploded view of a micro distance adjusting mechanism 2c according to a third embodiment of this disclosure, and FIG. 4B is a sectional view of the micro distance adjusting mechanism 2c of FIG. 4A.

Referring to FIGS. 4A and 4B, the component structures and connections of the micro distance adjusting mechanism 2c of the third embodiment are mostly the same as those of the above-mentioned micro distance adjusting mechanism 2a of the first embodiment. Unlike the first embodiment, the second body 221c of the second element 22c of the micro distance adjusting mechanism 2c is not configured with the annular recess and the stopper portion. The connection member 23c is connected to the second body 221c in a radial direction, and a travel space G is formed on the upper side of the first screw-connecting portion 212c. As shown in FIG. 4B, the connection member 23c of this embodiment is a pin, which radially passes through the second body 221c and the second screw-connecting portion 222c, and one end of the connection member 23c is inserted into the travel space G. Based on the design of restricting one end of the connection member 23c within the travel space G, the relative rotation of the first body 211c and the second body 221c can be limited to a relative rotation range when the first screw-connecting portion 212c and the second screw-connecting portion 222c rotate relative to each other for performing the micro distance adjustment. For example, the relative rotation range can be limited to less than 360 degrees, and the range of macro distance adjustment is from 0.1 mm to 3.5 mm. It should be noted that, according to the structural design of this embodiment, the maximum value of the relative rotation range can exceed 360 degrees, and this disclosure is not limited thereto. For example, the relative rotation range can be limited to less than 540 degrees, 720 degrees, etc.

In this embodiment, the micro distance adjusting mechanism 2 further includes a damping structure 25c, which contacts against the connection member 23c. In this case, the damping structure 25c is a rough surface formed on the periphery of the first body 211c next to one side of travel space G, and one end of the connection member 23c contacts against the damping structure 25c located at one side of the travel space G. The operations and functions of the damping structure 25c and the connection member 23c can be referred to the damping structure 25 and the connection member 23 of the previous embodiment, so the detailed descriptions thereof will be omitted.

In addition to the microscope devices and the macro distance adjusting mechanisms of the above-mentioned embodiments, the present disclosure also discloses a microscope device and a macro distance adjusting mechanism thereof of another embodiment, which are described in detail as follows.

A micro distance adjusting mechanism of another embodiment, which is configured for providing a micro distance adjustment of an objective lens unit of a microscope device on an optical route, includes a first element and a second element. The first element includes a first body, and the first body has a first through hole on the optical route. The second element includes a second body, and the second body has a second through hole on the optical route. The objective lens unit is telescoped in the first through hole and the second through hole, the first body and the second body are relative-movably connected, and the first body and the second body make a relative movement with each other during the micro distance adjustment. The relative movement includes a relative displacement and/or a relative rotation, wherein a range of the relative rotation is less than 360 degrees, and a range of the micro distance adjustment is between 0.1 mm and 3.5 mm.

In one aspect, the micro distance adjusting mechanism further includes a connection member connected to one of the first body and the second body. The other one of the first body and the second body is configured with an annular recess, and one end of the connection member extends into the annular recess.

In one aspect, the micro distance adjusting mechanism further includes a stopper portion arranged on a rotation route of the connection member so as to limit the range of the relative rotation within 360 degrees.

In one aspect, the connection member is a bolt or a pin, and the stopper portion is a protrusion.

In one aspect, the connection member extends in an axial direction or a radial direction to connect the first body or the second body.

In one aspect, the micro distance adjusting mechanism further includes a damping structure contacting against the connection member.

In one aspect, the damping structure is a rough surface, an uneven surface, a wavy surface, a serrated surface, a silicone material, a rubber material, or a combination thereof.

In one aspect, an edge of the second element is configured with a scale mark.

A microscope device includes an objective lens unit and a micro distance adjusting mechanism. The micro distance adjusting mechanism is configured for providing a micro distance adjustment of the objective lens unit on an optical route. The micro distance adjusting mechanism includes a first element and a second element. The first element includes a first body, and the first body has a first through hole on the optical route. The second element includes a second body, and the second body has a second through hole on the optical route. The objective lens unit is telescoped in the first through hole and the second through hole, the first body and the second body are relative-movably connected, and the first body and the second body make a relative movement with each other during the micro distance adjustment. The relative movement includes a relative displacement and/or a relative rotation, wherein a range of the relative rotation is less than 360 degrees, and a range of the micro distance adjustment is between 0.1 mm and 3.5 mm.

In one aspect, the microscope device further includes a stationary fixture having an opening located on the optical route, the micro distance adjusting mechanism is connected to the stationary fixture, and the objective lens unit corresponds to the opening.

In one aspect, the stationary fixture is configured to clamp an image capturing device, so that the image capturing device is arranged close to the objective lens unit and located on the optical route.

In one aspect, the microscope device further includes a sample carrier module detachably connected to the second element, and the sample carrier module has a sample observation zone close to the objective lens unit.

In one aspect, the sample carrier module is detachably connected to the second element by magnetic attraction.

In summary, the micro distance adjusting mechanism of this disclosure includes a first element, a second element and a connection member. The first element includes a first body and a first screw-connecting portion, and the second element includes a second body and a second screw-connecting portion. The objective lens unit is telescoped in a first through hole of the first body and a second through hole of the second body, the first screw-connecting portion is rotatably connected to the second screw-connecting portion, and the first body and the second body are relative movable with a relative rotation range during the micro distance adjustment. The connection member is connected to the first body or the second body for limiting the relative rotation range within 360 degrees and restricting a range of the micro distance adjustment to 0.1 mm~3.5 mm. Based on this design, the micro distance adjusting mechanism enables the objective lens unit of the microscope device to make a macro adjustment within a certain range on the optical route, so the distance between the objective lens unit and the target sample can be adjusted quickly and easily, thereby performing the observation at an optimum position and conveniently observing the three-dimensional sample.

Moreover, the micro distance adjusting mechanism of this disclosure includes a first element and a second element. The first element includes a first body, and the second element includes a second body. The objective lens unit is telescoped in a first through hole of the first body and a second through hole of the second body, the first body and the second body are relative-movably connected, and the first body and the second body make a relative movement with each other during the micro distance adjustment. The relative movement includes a relative displacement and/or a relative rotation, wherein a range of the relative rotation is less than 360 degrees, and a range of the micro distance adjustment is between 0.1 mm and 3.5 mm. Based on this design, the micro distance adjusting mechanism enables the objective lens unit of the microscope device to make a macro adjustment within a certain range on the optical route, so the distance between the objective lens unit and the target sample can be adjusted quickly and easily, thereby performing the observation at an optimum position and conveniently observing the three-dimensional sample.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A micro distance adjusting mechanism, which is configured for providing a micro distance adjustment of an objective lens unit of a microscope device on an optical route, the micro distance adjusting mechanism comprising:
a first element comprising a first body and a first screw-connecting portion, wherein the first body has a first through hole on the optical route;
a second element comprising a second body and a second screw-connecting portion, wherein the second body has a second through hole on the optical route, the objective lens unit is telescoped in the first through hole and the second through hole, the first screw-connecting portion is rotatably connected to the second screw-connecting portion, and the first body and the second body are relative movable with a relative rotation range during the micro distance adjustment;
a connection member connected to one of the first body and the second body in an axial direction or in a radial direction; and
a stopper portion arranged on a rotation route of the connection member,
wherein the connection member is configured to limit the relative rotation range within 360 degrees and to restrict a range of the micro distance adjustment to 0.1 mm~3.5 mm.

2. The micro distance adjusting mechanism of claim 1, wherein;
when the connection member is connected to the first body, the second body is configured with an annular recess, and one end of the connection member extends into the annular recess; or
when the connection member is connected to the second body, the first body is configured with an annular recess, and one end of the connection member extends into the annular recess.

3. The micro distance adjusting mechanism of claim 1, wherein the connection member is a bolt or a pin, and the stopper portion is a protrusion.

4. The micro distance adjusting mechanism of claim 1, further comprising:
a damping structure contacting against the connection member, wherein the damping structure is a rough surface, an uneven surface, a wavy surface, a serrated surface, a silicone material, a rubber material, or a combination thereof.

5. The micro distance adjusting mechanism of claim 1, wherein an edge of the second element is configured with a scale mark.

6. A micro distance adjusting mechanism, which is configured for providing a micro distance adjustment of an objective lens unit of a microscope device on an optical route, the micro distance adjusting mechanism comprising:
a first element comprising a first body, wherein the first body has a first through hole on the optical route;
a second element comprising a second body, wherein the second body has a second through hole on the optical route, the objective lens unit is telescoped in the first through hole and the second through hole, the first body and the second body are relative-movably connected, and the first body and the second body make a relative movement with each other during the micro distance adjustment;
a connection member connected to one of the first body and the second body in an axial direction or in a radial direction; and
a stopper portion arranged on a rotation route of the connection member,
wherein, the stopper portion limits the rotation of the connection member to a range in which the relative rotation between the first body and the second body is less than 360 degrees, and restricts a range of the micro distance adjustment is between 0.1 mm and 3.5 mm.

7. The micro distance adjusting mechanism of claim 6, wherein;
when the connection member is connected to the first body, the second body is configured with an annular recess, and one end of the connection member extends into the annular recess; or
when the connection member is connected to the second body, the first body is configured with an annular recess, and one end of the connection member extends into the annular recess.

8. The micro distance adjusting mechanism of claim 6, wherein the connection member is a bolt or a pin, and the stopper portion is a protrusion.

9. The micro distance adjusting mechanism of claim 6, further comprising:
a damping structure contacting against the connection member, wherein the damping structure is a rough surface, an uneven surface, a wavy surface, a serrated surface, a silicone material, a rubber material, or a combination thereof.

10. The micro distance adjusting mechanism of claim 6, wherein an edge of the second element is configured with a scale mark.

11. A microscope device, comprising:
an objective lens unit; and
a micro distance adjusting mechanism, which is configured for providing a micro distance adjustment of the objective lens unit on an optical route, wherein the micro distance adjusting mechanism comprises:
a first element comprising a first body and a first screw-connecting portion, wherein the first body has a first through hole on the optical route,
a second element comprising a second body and a second screw-connecting portion, wherein the second body has a second through hole on the optical route, the objective lens unit is telescoped in the first through hole and the second through hole, the first screw-connecting portion is rotatably connected to the second screw-connecting portion, and the first body and the second body are relative movable with a relative rotation range during the micro distance adjustment,
a connection member connected to one of the first body and the second body in an axial direction or in a radial direction, and
a stopper portion arranged on a rotation route of the connection member,
wherein the connection member is configured to limit the relative rotation range within 360 degrees and to restrict a range of the micro distance adjustment to 0.1 mm~3.5 mm.

12. The microscope device of claim 11, further comprising:
   a stationary fixture having an opening located on the optical route, wherein the micro distance adjusting mechanism is connected to the stationary fixture, and the objective lens unit corresponds to the opening.

13. The microscope device of claim 12, wherein the stationary fixture is configured to clamp an image capturing device, so that the image capturing device is arranged close to the objective lens unit and located on the optical route.

14. The microscope device of claim 11, further comprising:
   a sample carrier module detachably connected to the second element, wherein the sample carrier module has a sample observation zone close to the objective lens unit.

15. The microscope device of claim 14, wherein the sample carrier module is detachably connected to the second element by magnetic attraction.

16. The microscope device of claim 11, wherein the other one of the first body and the second body is configured with an annular recess, and one end of the connection member extends into the annular recess.

17. The microscope device of claim 11, wherein the micro distance adjusting mechanism further comprising:
   a damping structure contacting against the connection member, wherein the damping structure is a rough surface, an uneven surface, a wavy surface, a serrated surface, a silicone material, a rubber material, or a combination thereof.

* * * * *